3,563,698
PROCESS FOR PREPARING ZINC CYANIDE
John Derek Rushmere, Wilmington, Del., assignor to
E. I. du Pont de Nemours and Company, Wilmington,
Del., a corporation of Delaware
No Drawing. Filed Mar. 14, 1969, Ser. No. 807,403
Int. Cl. C01c 3/08
U.S. Cl. 23—79                                                                9 Claims

ABSTRACT OF THE DISCLOSURE

An aqueous slurry process for the manufacture of zinc cyanide by the reaction of zinc oxide and hydrogen cyanide is provided. The conversion of zinc oxide to zinc cyanide is improved by the presence of an acid having a pK between 2.5 and 7.5 such as acetic acid in an amount such that the equivalent ratio of acid to zinc oxide is less than about 0.3 to 1.

BACKGROUND OF THE INVENTION

Field of invention

This invention relates to processes for preparing zinc cyanide and more particularly to processes for preparing zinc cyanide from zinc oxide and hydrogen cyanide.

Prior art

Heretofore, zinc cyanide has been manufactured by the reaction in aqueous solution of a soluble zinc salt such as zinc sulfate with sodium cyanide. This is an old, costly process in terms of raw materials cost and also requires the disposal of waste sodium sulfate by-product.

SUMMARY OF THE INVENTION

According to the present invention there is provided a process for preparing zinc cyanide comprising reacting hydrogen cyanide with zinc oxide in water in the presence of an acid having a pK between 2.5 and 7.5 and in an amount such that the equivalent ratio of acid to zinc oxide is less than about 0.3 to 1, and separating the zinc cyanide formed.

DETAILED DESCRIPTION OF THE INVENTION

The present invention prepares zinc cyanide at ambient temperatures directly from hydrogen cyanide and zinc oxide and eliminates the disposal of by-product. The reaction is as follows:

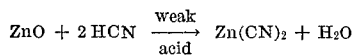
$$ZnO + 2HCN \xrightarrow[\text{acid}]{\text{weak}} Zn(CN)_2 + H_2O$$

By the addition of a small quantity of a weak solubilizing acid having a pK between 2.5 and 7.5 to the zinc oxide slurry before the hydrogen cyanide addition, an improvement is obtained in the conversion of the zinc oxide to zinc cyanide. The zinc cyanide so produced can be separated from the slurry by filtration to give a product of good commercial quality in high yields (100% based on zinc), or the product slurry from the reaction can be evaporated to dryness in the reaction vessel to remove water and unreacted hydrogen cyanide. This method also gives a product of good commercial quality.

Although the preparation of zinc cyanide is carried out as a slurry, it is believed that the reaction between zinc oxide and hydrogen cyanide occurs in the liquid phase:

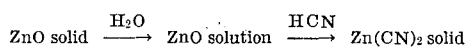
$$ZnO \text{ solid} \xrightarrow{H_2O} ZnO \text{ solution} \xrightarrow{HCN} Zn(CN)_2 \text{ solid}$$

Addition of a solubilizing acid, e.g., acetic acid, increases the amount of zinc oxide in solution and thereby facilitates conversion to zinc cyanide. The actual precipitation of zinc cyanide results through the reaction between soluble zinc ion and cyanide ion released by the dissociation of hydrogen cyanide.

The zinc oxide used in the invention can be any of the commercial grades of pure (99.8%) zinc oxide presently on the market. Although no significant difference in reactivity is observable using the various grades of zinc oxide, increased particle size would eventually become a limiting factor affecting the conversion of zinc oxide to the cyanide. Therefore, although the particle size of the zinc oxide is not critical, the preferred range for the average particle diameter is that used in the present invention, namely $5 \times 10^{-6}$ to $50 \times 10^{-6}$ cm. It is preferred that the zinc oxide concentration in the slurry be within the range of 10 to 30 percent by weight; however, the only consideration here is the use of a slurry consistent with obtaining vigorous agitation in commercial equipment.

The weak solubilizing acid added to the zinc oxide slurry has a pK between 2.5 and 7.5, preferably between 3 and 5. Hydrogen ion released in the dissociation of acids with a pK less than 2.5 represses the dissociation of hydrogen cyanide such that there is insufficient cyanide ion to effect conversion of the zinc oxide to zinc cyanide. Acids with a pK greater than 7.5 are of approximately the same strength as hydrogen cyanide and offer no advantage in improving the reaction of zinc oxide. The only consideration in the amount of acid used is economic since it is desired to keep the equivalent ratio of acid to zinc oxide as small as possible, consistent with preparing high quality zinc cyanide. Usually, the concentration of the acid is in an amount such that the equivalent ratio of acid to zinc oxide is less than about 0.3 to 1, preferably between 0.02 to 0.2 equivalent of acid per equivalent of zinc oxide.

The zinc salt of the solubilizing acid which is present should have a solubility at least equivalent, on a mole basis, to the amount of acid used. Otherwise, there is a tendency for insoluble zinc salt to coat the zinc oxide and prevent its solubilization and reaction to zinc cyanide.

Useful weak acids are the monocarboxylic acids of 1 to 4 carbon atoms, i.e., formic, acetic, propionic and butyric acids; halogenated monocarboxylic acids such as chloroacetic and chloropropionic acids and weak inorganic acids such as hypochlorous acid.

Zinc cyanide is formed usually by the direct addition of liquid hydrogen cyanide to the zinc oxide slurry containing the acid. When liquid hydrogen cyanide is used, temperature pressure relationships of the hydrogen cyanide must be satisfied to keep the hydrogen cyanide in liquid form. At atmospheric pressure, the temperature should be under 25° C. (below the boiling point of hydrogen cyanide) while for a system operating at a higher temperature, the hydrogen cyanide must be fed into the slurry under pressure to keep the hydrogen cyanide liquid. Although gaseous hydrogen cyanide can be used, liquid hydrogen cyanide is preferred.

Reaction temperatures are not critical, although it is generally preferred to add the liquid hydrogen cyanide to the acidified zinc oxide slurry maintained at ambient temperatures (22 to 28° C.). The reaction is exothermic and it is generally desirable to keep the reaction temperature below about 60° C. so as to prevent undue losses of hydrogen cyanide by vaporization.

The invention can be further understood by the following examples in which parts and percentages are by weight unless otherwise indicated.

EXAMPLES 1–8

A zinc oxide slurry was first prepared by adding the solid oxide to water in a resin kettle of appropriate capacity. The resin kettle was fitted with a lid through which passed a water condenser open to the atmosphere, a paddle stirrer, dropping funnel and thermometer. The solubilizing acid was next added to the slurry at ambient temperatures (22 to 28° C.) before commencing the hydrogen cyanide addition. A measured volume of liquid hydrogen cyanide was then run into the vigorously stirred slurry at rates between 10 to 30 cc./minute, the additions always being completed in 10 minutes or less. Conversion of the zinc oxide slurry to a zinc cyanide slurry was indicated by an exotherm of about 15 to 30° C. temperature rise per 100 grams zinc oxide reacted. If necessary, the kettle was cooled in ice water to keep the slurry temperature below 60° C.

As soon as the addition of hydrogen cyanide was complete, the product was filtered and dried. Further stirring did not significantly increase the existing conversion of zinc oxide to zinc cyanide.

Table I below lists the results of zinc cyanide preparations using the process. The beneficial effects of the solubilizing acid is demonstrated by comparing the results of the Control Example (no acid added) with the subsequent examples.

2. The process of claim 1 wherein the acid has a pK between 3 and 5 and the hydrogen cyanide is liquid.

3. The process of claim 2 wherein the average particle diameter of zinc oxide is within the range of about $5 \times 10^{-6}$ to $50 \times 10^{-6}$ cm., the equivalent ratio of acid to zinc oxide is within the range of about 0.02 to 0.2, and the zinc oxide concentration in the water is between 10 and 30 percent by weight.

4. The process of claim 3 wherein the acid is acetic acid.

5. A process for preparing zinc cyanide comprising: forming an aqueous slurry of zinc oxide containing an acid having a pK between 2.5 and 7.5 in an amount such that the equivalent ratio of acid to zinc oxide is less than about 0.3 to 1; adding liquid hydrogen cyanide to the slurry whereby the hydrogen cyanide is reacted with the zinc oxide to form an aqueous slurry of zinc cyanide; and separating the zinc cyanide from the slurry.

6. The process of claim 5 wherein the acid has a pK between 3 and 5.

7. The process of claim 6 wherein the acid is acetic acid.

TABLE I

| Example No. | ZnO used | Solubilizing acid | pK | Wt. of slurry, gms. | Wt. percent ZnO in slurry | Equiv. ratio, acid/ZnO | HCN added, mole HCN/ZnO | Product assay Wt. percent CN | Wt. percent Zn |
|---|---|---|---|---|---|---|---|---|---|
| Control | A | None | 0 | 890 | 10.1 | 0 | 2.07 | 38.7 | |
| 1 | A | Acetic | 4.75 | 895 | 10.1 | 0.04 | 1.96 | 40.5 | 58.2 |
| 2 | A | do | 4.75 | 1,005 | 10.0 | 0.12 | 2.07 | 42.6 | 56.5 |
| 3 | B | do | 4.75 | 1,010 | 19.8 | 0.04 | 2.01 | 40.5 | |
| 4 | B | do | 4.75 | 1,015 | 29.6 | 0.04 | 1.97 | 40.7 | |
| 5 | C | do | 4.75 | 256 | 18.0 | 0.15 | 2.00 | 42.4 | |
| 6 | D | do | 4.75 | 254 | 18.1 | 0.13 | 2.00 | 42.9 | |
| 7 | D | Chloroacetic | 2.85 | 256 | 18.0 | 0.10 | 2.00 | 40.5 | |
| 8 | E | Formic | 3.75 | 248 | 10.0 | 0.10 | 2.00 | 41.0 | |

NOTE—ZnO grades used: A=Baker and Adamson, A.C.S.; B=St. Joseph Lead Co., #922; C=St. Joseph Lead Do., #911; D=New Jersey Zinc Co., #XX78; E=New Jersey Zinc Co., #Kadox 15.

Pure zinc cyanide contains theoretically 55.7 percent by weight zinc and 44.3 percent by weight cyanide. However, because of the extreme difficulties generally encountered in preparing the salts of weak acids (hydrogen cyanide) with weak bases (zinc) specifications for commercial grades of zinc cyanide call for minimum assays of 55 percent by weight zinc and 40 percent by weight cyanide. It should be noted that since the molecular weight for zinc oxide (81) is less than that for zinc cyanide (117), zinc cyanide prepared from zinc oxide and meeting the minimum assay for cyanide will automatically meet the minimum assay requirements for zinc.

What is claimed is:

1. A process for preparing zinc cyanide comprising: reacting hydrogen cyanide with zinc oxide in water in the presence of an acid having a pK between 2.5 and 7.5 and in an amount such that the equivalent ratio of acid to zinc oxide is less than about 0.3 to 1, and separating the zinc cyanide formed.

8. The process of claim 5 wherein the average particle diameter of zinc oxide is within the range of about $5 \times 10^{-6}$ to $50 \times 10^{-6}$ cm. and the equivalent ratio of acid to zinc oxide is within the range of about 0.02 to 0.2.

9. The process of claim 8 wherein the acid is acetic acid and the slurry concentration is between 10 and 30 percent by weight zinc oxide.

References Cited
UNITED STATES PATENTS 1,178,081  4/1916  Laying _____ 23—79
3,056,648  10/1962  Childers et al. _____ 23—55

OSCAR R. VERTIZ, Primary Examiner

H. S. MILLER, Assistant Examiner